United States Patent [19]

Risley

[11] Patent Number: 4,894,951

[45] Date of Patent: Jan. 23, 1990

[54] PLANT CAGE APPARATUS

[76] Inventor: Charles P. Risley, 34 Hanford Ave., Apt. 2, Bridgeport, Conn. 06605

[21] Appl. No.: 274,367

[22] Filed: Nov. 21, 1988

[51] Int. Cl.⁴ .............................................. A01G 9/12
[52] U.S. Cl. ...................................................... 47/45
[58] Field of Search ................. 52/648; 403/174, 178, 403/265, 267, 268, 391; 47/45, 47, 46, 26, 28

[56] References Cited

U.S. PATENT DOCUMENTS

| | | | |
|---|---|---|---|
| 199,353 | 1/1878 | Clark | 47/45 |
| 2,132,568 | 10/1938 | Jacobs | 47/45 X |
| 2,501,359 | 3/1950 | Stilson | 47/45 X |
| 3,264,783 | 8/1966 | Bayliss | 47/45 |
| 3,299,569 | 1/1967 | Lemnck | 47/45 |
| 4,005,548 | 2/1977 | Nahon | 47/45 |
| 4,026,068 | 5/1977 | Teppe | 47/45 |
| 4,589,236 | 5/1986 | McAllister | 403/178 X |
| 4,651,466 | 3/1987 | Robinson | 47/26 X |

FOREIGN PATENT DOCUMENTS 1247992  6/1960  France ...................................... 47/45

Primary Examiner—Henry S. Raduazo
Assistant Examiner—Jerrold D. Johnson
Attorney, Agent, or Firm—Leon Gilden

[57] ABSTRACT

A plant cage apparatus is set forth wherein a matrix of interconnected vertical and horizontal arcuate rod members are interconnected at junctures by connector members wherein the connector members slidingly accept ends of respective horizontal and vertical members to enable expansion or contraction of the cage apparatus to accommodate plant growth. Terminal ends of respective horizontal members defining terminal junctions of a respective cage structure along one vertical perimeter are formed with projecting tapered ends at the cage and connector members are formed at the other vertical perimeter side of the cage. The connector members accommodate the tapered end portions for joinder of two respective semi-cylindrical cage structures to form a continuous cage apparatus.

1 Claim, 1 Drawing Sheet

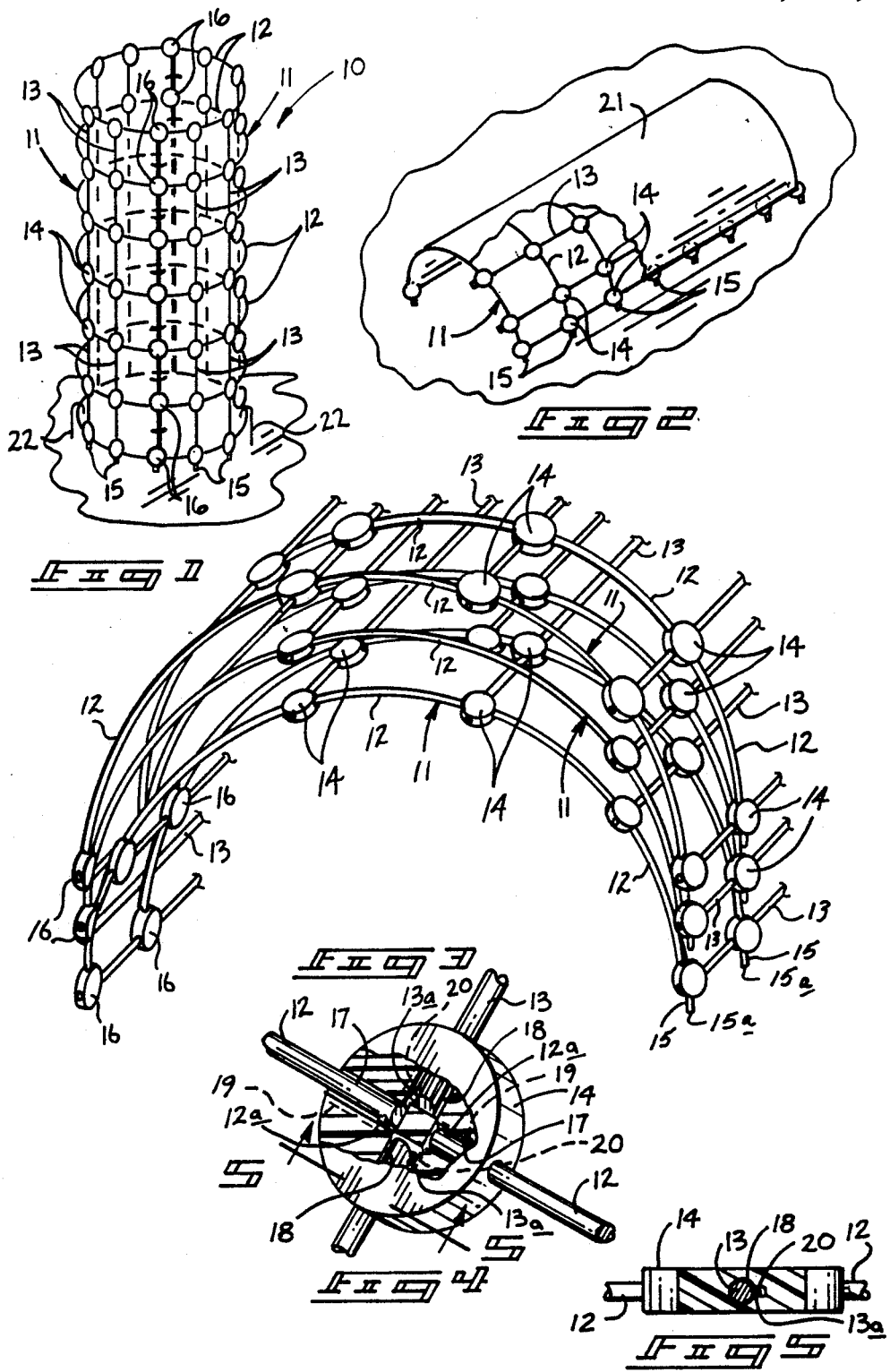

PLANT CAGE APPARATUS

BACKGROUND OF THE INVENTION

1. Field of the Invention

The present invention relates to plant cages, and more particularly pertains to a new and improved plant cage apparatus selectively expandable to accommodate plant growth.

2. Description of the Prior Art

Prior art devices have attempted to set forth plant cage organizations to accommodate plant organizations, but have heretofore failed to accommodate plant growth by expansion of juncture points as does the instant invention. For example, U.S. Pat. No. 4,005,548 to Nahon sets forth a plant support cage wherein a plurality of upright support rods are provided with crossed wire holders wherein ends of the wires are of generally "C" shaped configuration to define gaps to prevent cross wires to slide past associated space holders on the support rods.

U.S. Pat. No. 4,026,068 to Tepper sets forth a tomato plant cage organization wherein a plurality of aligned stakes are provided with a series of lateral members extending from the stakes to support vines of an associated plant. The lateral supports are positioned to accommodate plant growth.

U.S. Pat. No. 4,073,091 to Vogel sets forth a foldable plant support provided with a generally rectangular type framework that is securable when in an unfolded state to accommodate plant growth and support thereof.

U.S. Pat. No. 4,667,438 to Corell sets forth a tomato-type cage wherein the same may be quickly and readily assembled for use and provided with a plurality of openings in a series of upright support rods to accommodate angulated connector ends of associated horizontal support elements.

As such, it may be appreciated that there continues to be a need for a new and improved plant cage apparatus wherein the same addresses both the problems of adaptability and storage when not in use and in this respect, the present invention substantially fulfills this need.

SUMMARY OF THE INVENTION

In view of the foregoing disadvantages inherent in the known types of plant cage apparatus now present in the prior art, the present invention provides a plant cage apparatus wherein the same is provided with a series of connector members to accommodate expansion or contraction of the plant cage apparatus to accommodate associated plant development and may further be compactly stored when not in use. As such, the general purpose of the present invention, which will be described subsequently in greater detail, is to provide a new and improved plant cage apparatus which has all the advantages of the prior art plant cage apparatus and none of the disadvantages.

To attain this, the present invention comprises a parallel series of horizontal intermediate members orthogonally oriented to vertical intermediate members at junctures wherein the horizontal and vertical intermediate members are secured by connector members slidingly thereto to accommodate vertical and horizontal adjustment and expansion or contraction of the assembled apparatus. Terminal horizontal members are defined at horizontal perimeters of a respective semi-circular plant cage organization wherein a first perimeter series of terminal horizontal members are formed with enlarged tapered ends for intercommunication with connector members formed at terminal ends of the second perimeter of a second semi-circular cage organization wherein a pair of semi-circular cage organizations are thereby securable together to provide a complete plant cage apparatus of generally circular cross-sectional configuration.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved plant cage apparatus which has all the advantages of the prior art plant cage apparatus and none of the disadvantages.

It is another object of the present invention to provide a new and improved plant cage apparatus which may be easily and efficiently manufactured and marketed.

It is a further object of the present invention to provide a new and improved plant cage apparatus which is of a durable and reliable construction.

An even further object of the present invention is to provide a new and improved plant cage apparatus which is susceptible of a low cost of manufacture with regard to both materials and labor, and which accordingly is then susceptible of low prices of sale to the consuming public, thereby making such plant cage apparatus economically available to the buying public.

Still yet another object of the present invention is to provide a new and improved plant cage apparatus which provides in the apparatuses and methods of the prior art some of the advantages thereof, while simultaneously overcoming some of the disadvantages normally associated therewith.

Still another object of the present invention is to provide a new and improved plant cage apparatus wherein the same provides for a matrix of horizontal and vertical members adjustably securable relative to one another to expand an associated plant cage apparatus to accommodate growth of an associated plant.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an isometric illustration of a single semi-circular plant cage organization utilized as a temporary greenhouse to protect seedlings from early frost.

FIG. 3 is an isometric illustration of a series of semi-circular plant cage organizations in a stacked and nested arrangement.

FIG. 4 is an isometric illustration of setting forth detail of a typical connector member utilized by the instant invention.

FIG. 5 is an orthographic view taken along the lines 5—5 of FIG. 4, in the direction indicated by the arrows.

DESCRIPTION OF THE PREFERRED EMBODIMENT

With reference now to the drawings, and in particular to FIGS. 1 to 4 thereof, a new and improved plant cage apparatus embodying the principles and concepts of the present invention and generally designated by the reference numeral 10 will be described.

More specifically, it will be noted that the plant cage apparatus 10 essentially comprises a plurality of semi-circular plant cage organizations 11 each formed of a matrix of intersecting horizontal and vertical members. More specifically, the horizontal members comprise horizontal intermediate members 12 orthogonally intersecting with vertical intermediate members 13. Each of the arcuate horizontal and vertical intermediate members 12 and 13 respectively are formed with a projecting node 12a and 13a respectively at each end of a respective member, as may be seen in FIG. 4 for example. The nodes prevent the respective members 12 and 13 from withdrawing from an associated connector member 14. Each connector member 14 is utilized at each intersection of respective horizontal and vertical intermediate members and is formed with a plurality of orthogonally intersecting openings comprising a through-extending horizontal channel 17 orthogonally intersecting a through-extending vertical channel 18. Each respective channel is formed with a respective horizontal slit 19 and vertical slit 20. The aforenoted nodes 12a and 13a project upwardly through the respective slits 19 and 20 to guidingly enable the respective horizontal and vertical members to slide within the respective channels 17 and 18. The upwardly projecting nodes 12a and 13a of respective members 12 and 13 prevent withdrawal of the respective members from the channels as the diameter of respective intermediate member 12 and 13 is of complementary configuration to a respective through-extending channel 17 and 18 wherein the upwardly projecting nodes 12a and 13a therefore are of a greater dimension than the channel openings and prevent withdrawal of respective intermediate members, but enable contraction of expansion of the grid work forming each semi-circular plant cage organization 11.

Aligned with each end of the horizontal intermediate members 12 are a coextensive series of terminal end horizontal members 15 formed with tapered ends 15a of reduced diameter relative to the cross-section of the terminal end horizontal members 15 to define at a vertical perimeter of a cage. The terminal end horizontal members 15 are formed along one side of a semi-circular plant cage organization 11 with the other vertical perimeter side terminating in terminal end connector members 16. The terminal end connector members 16 are similarly formed as the connector members 14 but are provided with a vacant horizontal through-extending channel to thereby accept a terminal end horizontal member 15 of a companion semi-circular plant cage organization 11 to thereby enable union of a plurality of semi-circular plant cage organizations 11 to form a plant cage 10, as illustrated in FIG. 1 for example.

The semi-circular plant cage organizations 11 may be utilized individually wherein the terminal end horizontal members 15 may be projected into a bedding area for plants to provide for a temporary greenhouse by covering the semi-circular plant cage 11 with a polymeric sheet 21, as illustrated in FIG. 2 for example.

Additionally, "U" shaped ground connectors 22 are utilized with the instant invention wherein an upward terminal end of a ground connector is formed with a "U" shaped hook to overlie an associated horizontal intermediate member 12 wherein the other end of the ground connector is driven into the ground to secure the plant cage apparatus relative to an associated plant.

It may be understood therefore that as desired, by slidingly adjusting the respective horizontal and vertical intermediate members 12 and 13 within the respective through-extending channels 17 and 18, the apparatus of the instant invention may be expanded or contracted as desired and create grids defined by a plurality of opposed horizontal and vertical intermediate members 12 and 13 of increased dimension to increase both the diameter and height of the plant cage apparatus 10.

The manner of usage and operation therefore of the instant invention should be apparent from the above description, and accordingly no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A plant cage apparatus comprising,
   at least two semi-circular plant cage organization including a plurality of parallel spaced horizontal members, and
   a plurality of parallel spaced vertical members wherein each of said vertical members is formed with a first and second vertical end, and
   each of said horizontal members is formed with a first and second end, and
   each of said ends of said horizontal and vertical member is adjustably secured within a connector member at a juncture of said horizontal and vertical ends wherein said connector members is adjustably secured each said ends therewithin, and
   said plant cage organization is defined by a first and second vertical perimeter wherein a series of terminal horizontal members extend coextensively along said first vertical perimeter and extend coextensively with an adjacent horizontal member, and
   said second vertical perimeter is defined by a series of terminal connector members aligned with and adjacent a horizontal member, and
   wherein the terminal connector members of a first plant cage organization accept the terminal horizontal members of a second plant cage organization to define a generally cylindrical plant cage apparatus, and
   wherein said terminal horizontal members each include a tapered end for enhancing securement interiorly of an associated terminal connector member, and
   wherein each of said connector members includes a plurality of through-extending orthogonally intersecting channels, and
   wherein each of said channels includes an axially parallel slit formed on each channel wall, and said slit is of a length less than the length of said channel, and
   wherein each end of each horizontal and vertical member is formed with an integrally and upwardly projecting node slidingly positionable within said slit to maintain the respective horizontal and vertical member operatably associated with a respective connector member, and
   further including a plurality of "U" shaped ground connector means for securement of the plant cage apparatus relative to an associated plant wherein each connector means is of a generally "U" shaped configuration including a plurality of legs wherein a first leg is a greater length than a second leg, and the second leg overlies a horizontal member.

* * * * *